United States Patent
Boban (10) Patent No.: US 10,070,338 B2
(45) Date of Patent: Sep. 4, 2018

(54) METHOD FOR MULTI-CHANNEL OPERATION IN A VEHICULAR NETWORK AND VEHICULAR NETWORK

(71) Applicant: NEC Europe Ltd., Heidelberg (DE)

(72) Inventor: Mate Boban, Munich (DE)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 15/500,124

(22) PCT Filed: Jun. 2, 2016

(86) PCT No.: PCT/EP2016/062564
§ 371 (c)(1),
(2) Date: Jan. 30, 2017

(87) PCT Pub. No.: WO2016/198320
PCT Pub. Date: Dec. 15, 2016

(65) Prior Publication Data
US 2017/0272971 A1   Sep. 21, 2017

(30) Foreign Application Priority Data

Jun. 8, 2015 (EP) ...................................... 15171035

(51) Int. Cl.
*H04L 12/26* (2006.01)
*H04W 28/02* (2009.01)
(Continued)

(52) U.S. Cl.
CPC ......... *H04W 28/0215* (2013.01); *H04L 67/16* (2013.01); *H04W 28/0252* (2013.01);
(Continued)

(58) Field of Classification Search
CPC ............. H04W 28/0215; H04W 48/10; H04W 28/0252; H04W 84/005; H04L 67/16; H04L 67/12
See application file for complete search history.

(56) References Cited

U.S. PATENT DOCUMENTS 8,363,102 B1 *   1/2013   Kadoch ................... H04N 7/18
348/148
2011/0306353 A1   12/2011   Kim et al.
(Continued)

OTHER PUBLICATIONS

Miguel Sepulcre et al: "Congestion and Awareness Control in Cooperative Vehicular Systems", Proceedings of the IEEE, IEEE. New York, US, vol. 99, No. 7, Jul. 1, 2011 (Jul. 1, 2011), pp. 1260-1279, XP011367584.

*Primary Examiner* — Afshawn M Towfighi
(74) *Attorney, Agent, or Firm* — Leydig, Voit & Mayer, Ltd.

(57) ABSTRACT

A method for multi-channel operation in a vehicular network, the vehicular network including a plurality of communicating entities being designated as either a service provider or as a service user, a control channel for exchanging management frames among the communicating entities, and at least two different service channels for application-specific information exchange among the communicating entities, includes performing, by the communication entities, channel load estimation through a combination of physical channel measurements and an analysis of the transmitted service announcement messages (SAM) generated by service providers; and performing, by the communication entities based on the results of the channel load estimation together with existing services on the service channels and user and/or application preference configurations, dynamic service channel switching to either provide or consume a service.

15 Claims, 4 Drawing Sheets

(51) Int. Cl.
   *H04W 48/10*     (2009.01)
   *H04L 29/08*     (2006.01)
   *H04W 84/00*     (2009.01)

(52) U.S. Cl.
   CPC ............. *H04W 48/10* (2013.01); *H04L 67/12* (2013.01); *H04W 84/005* (2013.01)

(56) References Cited

U.S. PATENT DOCUMENTS

2015/0039391 A1\* 2/2015 Hershkovitz .......... G06Q 10/04
                                                   705/7.31
2017/0043671 A1\* 2/2017 Campbell .............. G01C 21/34

\* cited by examiner

METHOD FOR MULTI-CHANNEL OPERATION IN A VEHICULAR NETWORK AND VEHICULAR NETWORK

CROSS REFERENCE TO RELATED APPLICATIONS

This application is a U.S. National Stage Application under 35 U.S.C. § 371 of International Application No. PCT/EP2016/062564 filed on Jun. 2, 2016, and claims benefit to European Patent Application No. EP 15171035.7 filed on Jun. 8, 2015. The International Application was published in English on Dec. 15, 2016 as WO 2016/198320 A1 under PCT Article 21(2).

FIELD

The present invention generally relates to a method for multi-channel operation in a vehicular network, as well as to a vehicular network with multi-channel operations support.

BACKGROUND

For the purpose of road safety and traffic efficiency, vehicular networks will primarily operate in the 5.9 GHz frequency band. By regulation, this spectrum is split into several wireless channels of 10 MHz bandwidth. In order to efficiently utilize the spectrum, vehicles need to operate on multiple channels simultaneously, also referred to as multi-channel operation (MCO). IEEE 1609.4 (for reference, see IEEE, IEEE 1609.4-2010—IEEE Trial-Use Standard for Wireless Access in Vehicular Environments (WAVE)—Multi-Channel Operation, IEEE Std., 2010) is a standard for MCO for the IEEE 1609 protocol stack. It relies on channel switching or alternating between a Control Channel (CCH) and Service Channels (SCHs) for single-radio transceivers, and between SCH for dual-radio transceivers; the latter when considering that one radio is constantly tuned in the CCH. However, in addition to not considering the application relevance, this time division oriented channel switching approach was shown to be inefficient in channel utilization (for reference, see Chen, Q., Jiang, D., & Delgrossi, L. (2009). IEEE 1609.4 DSRC Multi-Channel Operations and Its Implications on Vehicle Safety Communications. In Vehicular Networking Conference (VNC), 2009 IEEE (pp. 1-8)). Also, simTD (for reference, see H. Stubing, M. Bechler, D. Heussner, T. May, I. Radusch, H. Rechner, and P. Vogel: "sim td: a car-to-x system architecture for field operational tests [topics in automotive networking]", in IEEE Communications Magazine, vol. 48, no. 5, pp. 148-154, 2010), one of the major field trials for inter-vehicular communication, has developed architecture and message formats for MCO.

The design of a MCO solution is challenging due to the characteristics of VANETs: Their applications have specific requirements with distinct requirements, particularly for latency and reliability, which MCO must provide support. Furthermore, the decentralized organization of VANETS and their dynamic and ephemeral characteristics creates challenges in protocol design, where nodes only have local information available for decision making. MCO can be enabled by single or dual-radio transceivers. Although the initial release of inter-vehicular communication systems is based on single-radio transceiver, it is foreseen that the next generations rely on dual-radio transceiver settings for improved performance.

SUMMARY

In an embodiment, the present invention provides a method for multi-channel operation in a vehicular network, the vehicular network including a plurality of communicating entities being designated as either a service provider or as a service user, a control channel for exchanging management frames among the communicating entities, and at least two different service channels for application-specific information exchange among the communicating entities. The method includes performing, by the communication entities, channel load estimation through a combination of physical channel measurements and an analysis of the transmitted service announcement messages (SAM) generated by service providers; and performing, by the communication entities based on the results of the channel load estimation together with existing services on the service channels and user and/or application preference configurations, dynamic service channel switching to either provide or consume a service.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Mechanisms for efficient channel load estimation and switching when there is a need to switch the channel dynamically in order to support various applications/services in vehicular networks have not been detailed by the above mentioned efforts. Most of the existing work focuses on channel utilization, synchronization, and related lower-layer performance indicators.

A method for multi-channel operation in a vehicular network and a vehicular network with multi-channel operations support are described herein in which the efficiency of multiple channel usage is enhanced, while ensuring stability and continuity in the service channels, in particular for prioritized applications and high priority services.

A method for multi-channel operation in a vehicular network is described herein, wherein said network includes a plurality of communicating entities, said communicating entities being designated either as service provider or as service user, a control channel for exchanging management frames among said communicating entities, and at least two different service channels for application-specific information exchanges among said communicating entities. The method includes performing, by said communicating entities, channel load estimation through a combination of physical channel measurements and an analysis of the transmitted service announcement messages (SAM) generated by service providers, and based on the results of said channel load estimation together with existing services on said service channels and user and/or application preference configurations, performing dynamic service channel switching to either provide or consume a service.

A vehicular network with multi-channel operation support is described herein, said network including a plurality of communicating entities, said communicating entities being designated either as service provider or as service user, a control channel for exchanging management frames among said communicating entities, and at least two different service channels for application-specific information exchanges among said communicating entities, wherein said communicating entities are configured to perform channel load estimation through a combination of physical channel measurements and an analysis of the transmitted service announcement messages (SAM) generated by service providers, and based on the results of said channel load estimation together with existing services on said service channels and user and/or application preference configurations, to perform dynamic service channel switching to either provide or consume a service.

AA practical, dynamic channel switching MCO solution is described herein that takes into account (estimated) channel load, existing services on service channels and user and/or application preference configurations, defined for preferably both service providers and service users. The channel load estimation mechanism in accordance with the present invention relies on combined physical measurements and Service Announcement Message overhearing on the control channel. By exploiting control channel announcements, stability is achieved in service channels. Consequently, a method according to an embodiment of the present invention can also be applied as an improvement of existing standardized solutions for vehicular congestion control.

Embodiments of the present invention can define new Service Provider operation for application prioritization channel and channel switching that takes into account dynamic information on channel load and application requirements. Furthermore, embodiments of the present invention can define new Service User operation for channel switching based on user preferences and application priorities. By providing the ability to prioritize the applications/services on both the Service Provider and Service User side, these embodiments are able to efficiently support any future applications/services.

In contrast to existing MCO solutions, embodiments of the present invention can take into account the dynamic environment generated by a combination of various applications provided by both mobile and static providers and limited channel resources. In particular, in contrast to IEEE 1609.4, as mentioned above, which is application-static and channel-load-static, meaning the channel switching does not occur due to application requirements, embodiments of the present invention can realize a dynamic solution, i.e., service channels are dynamically switched according to relevant input information from applications and due to channel conditions. Embodiments can take the input from user mechanisms to adapt to dynamic application and channel environments.

It could be shown in simulations, where a large number of platoons were passing near RSUs and mobile service providers, which generated load up to the maximum allowed per channel, that the method according to the present invention works particularly well in such challenging and dynamic highway scenarios. By applying the present invention, each SU is able to consume its highest priority application even in case of fully loaded channels. Furthermore, a method according to an embodiment of the present invention effectively enables prioritization; given scarce resources, the highest priority applications do not suffer due to the presence of lower priority applications.

According to an embodiment, each communicating entity/node (e.g., either a vehicle or roadside unit, RSU) may continuously log the Service Announcement Messages (SAMs) transmitted on CCH by each service provider. SAMs may be configured to contain information that indicates, e.g., service priority, service channel number, the Protocol Identifier and/or content type of the message to be delivered by a particular service. For each SCH, the communicating entity may keep an estimate of the channel load based on the information contained in the SAMs. In the context of the analysis of SAMs, the communicating entities may take into consideration the relevance of each SAM based on the time period after reception of the respective SAM and/or the distance of the respective communicating entity to the sender of the respective SAM. Specifically, a time window and a weighing function may be in place that determine how relevant each received SAM is based on any of the above criteria, i.e.: 1) how long ago the SA message was received; and 2) the distance to the sender of SA message.

According to an embodiment, the physical channel measurements may be performed passively for those channels a communicating entity is currently switched on. In other words, each communicating node calculates the channel load (e.g. by using Channel Busy Ratio (CBR) or similar methods) for channels it is currently on, i.e. CCH and one of the SCHs, in a passive mode whereby the node does not move to any particular channel just to measure that channel's load; rather it takes the opportunity to measure the load since it is already tuned to that channel.

According to an embodiment, it may be provided that communicating entities participating in a cooperative application that includes or even requires continuous exchange of messages among the participants (e.g., vehicles forming a platoon, cooperative cruise control, etc.), provide collected information about their channel measurements and about overheard SAMs to a coordinating entity of the corporative application. For instance, the participants of a corporative application may spend a portion of their channel time scanning other channels and report the scanning results to said coordinating entity of said corporative application.

Specifically, in a cooperative application the channel load estimation provisions for using the continuous message exchange as an input as follows: Since multiple nearby vehicles communicate, they can also collect information about their channel measurements and overheard SAMs and provide that information to coordinating vehicle (e.g. platoon leader). This information can contain load estimates from multiple channels, since i) some of the vehicles might receive information not available to other vehicles in the platoon; and ii) in a coordinated fashion, they can spend some of their channel time scanning other channels and reporting the results to the coordinating vehicle. Based on this input, the platoon leader is able to better estimate the channel load for the entire platoon, as opposed to each vehicle estimating the load by itself.

According to an embodiment, a service provider may be configured to determine the current number of services per service channel (provided by any of the communicating entities, e.g. ITS-G5 nodes) by tracking the SAMs broadcasted on the control channel. This number of services per service channel may then be employed as input information for a channel selection algorithm.

According to an embodiment, a service provider may be configured to use user and/or application preference configurations to determine service priorities and to decide which service to advertise in case of concurrent services. By providing the ability to prioritize the applications/services on both the service provider and service user side, the solution is able to efficiently support any future applications/services.

According to an embodiment, when a service provider has a new service to advertise, the service provider may choose the same service channel that the service provider's other services are using if the resulting load on that service channel is below a predefined maximum channel load. If the service provider does not have any currently advertise services, it may choose the service channel with the currently lowest channel load for the new schedule.

According to an embodiment, if there are parallel/concurrent services from a service provider and the load on the service channel the service provider is transmitting on exceeds a predefined maximum channel load, the service provider may drop lower priority services of its concurrent services. Each service provider may repeat this procedure until the number of services and their resulting load is equal or less than maximum channel load. Dropped services may be rescheduled later (after a certain amount of delay and if channel load is below maximum).

According to an embodiment, a service user may be configured to monitor (regularly or continuously) the SAMs broadcast on the control channel. Based thereupon, a service user may perform a check whether any of its transceivers is tuned on the service channel with the currently highest priority service. This check may be performed in regular intervals, in particular upon the reception of a SAM on the control channel.

According to an embodiment, when a service, a service users interested in, is being advertised by a service provider, the service user may move one of its transceivers (i.e. one that is not tuned to the control channel) to the service channel the advertised service is on. When a service is being announced having a higher priority than the service with the currently highest priority (which a service user can get to aware of by tracking the SAMs on the control channel, as mentioned above), the service user may switch to the service channel where that higher priority service is provided. In case of concurrent services with the same priority, the service user may select one of the concurrent services randomly. By performing dynamic channels switching as described above, which takes into account dynamic information on channel load and application requirements/prioritization, it is ensured that the highest priority service in the area is being serviced in a reliable and continuous fashion.

According to an embodiment, the user preference database and/or the service/application preference database that are maintained in the vehicles (e.g. stored on a hardware platform that is part of the vehicle's on-board unit, OBU) may be set as default (i.e. upon delivery of the vehicles) and may be configured to allow users to define customized preferences.

Hereinafter, the term 'CCH' will be generally employed to denote a control channel, which is a radio channel used for exchange of management frames. Similarly, the term 'SCH' will be employed to denote service channels, which are secondary channels used for application-specific information exchanges.

Figure 1:
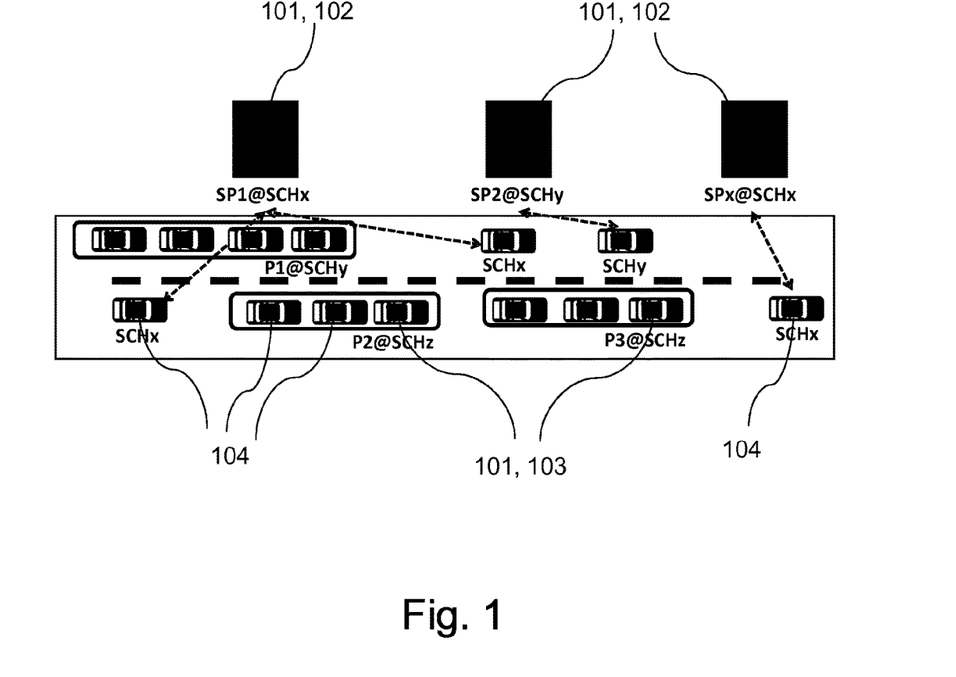
FIG. 1 is a schematic view illustrating a highway scenario with static service providers and mobile service providers operating on multiple channels in which an embodiment of the present invention can be suitably applied.

FIG. 1 depicts a typical highway scenario, in which embodiments of the present invention can be suitably applied. Generally, in order to initiate communications on an SCH, an RSU or an OBU (On-Board Unit) transmits dedicated announcement frames on the CCH to advertise offered services available on that SCH. Such a device is called a s service provider. An OBU receives the announcement on the CCH and generally establishes communications with the service provider on the specified SCH; such a device will be termed service user hereinafter.

The highway scenario shown in FIG. 1 includes multiple service providers 101 (hereinafter briefly SPs), both mobile and static: the SP1-SP3 are RSUs 102 that can provide different type of services to vehicles (e.g., safety message relaying, traffic information, etc.). In addition, there are three platoons (P1-P3), where a platoon leader provides a mobile service (i.e., platoon leader is a mobile SP 103) that other vehicles in a platoon are using, thus functioning as service users 104 (hereinafter briefly SUs). For the sake of completeness it is noted that FIG. 1 depicts further vehicles that function as SUs 104 individually, i.e. without being participant of a platoon.

Generally, an embodiment of the present invention described hereinafter in detail focuses on designing an MCO solution for an ITS-G5 based multi-transceiver (or at least dual transceiver) design for V2X systems (which is the proposed design for ETSI/C2C-CC) that is able to exploit control channel announcements to achieve stability in service channels, in particular for high priority services. Supporting a large number of such services would not be possible on a single channel. An embodiment of the present invention can provide mechanisms for efficient use of multiple channels to enable a larger number of services and to enable future applications in vehicular networks through multi-channel operation.

Channel load estimation for multiple channels is not trivial unless the number of deployed transceivers is the same as the number of existing channels. Specifically, certain amount of time is lost when a radio moves from one channel to another (i.e., the channel switching time is not negligible). IEEE 1609.4 defines minimum channel switching performance to be 100 ms (i.e., the transceiver should be able to switch channels at least 10 times per second). Furthermore, besides channel switching, to estimate the load on the channel, the transceiver needs to stay on the channel for a certain period of time. This implies that: 1) in case when the number of channels is large, comparatively more time is spend switching across channels and measuring load; and 2) inherently, the measured load is an estimate of the channel load across a longer period of time (since the assumption is that the transceiver cannot be tuned to a channel all the time). For these reasons, embodiments of the present invention apply a new channel load estimation algorithm, as will be described hereinafter in detail.

According to a specific implementation of an embodiment of the present invention, a method for Multi-Channel Operation in vehicular network may comprise the following steps:

1) Applying a channel load estimation algorithm through combined active physical channel estimation and by analyzing the transmitted Service Announcement Messages generated by Service Providers;
2) Loading User and App preference configurations for both SP and SU;
3) Switching the service channel to either provide a service (in case of SP) or consume a service (in case of SU); and
4) Repeating above steps concurrently on all communicating entities designated as either the SP or SU.

Figure 2:
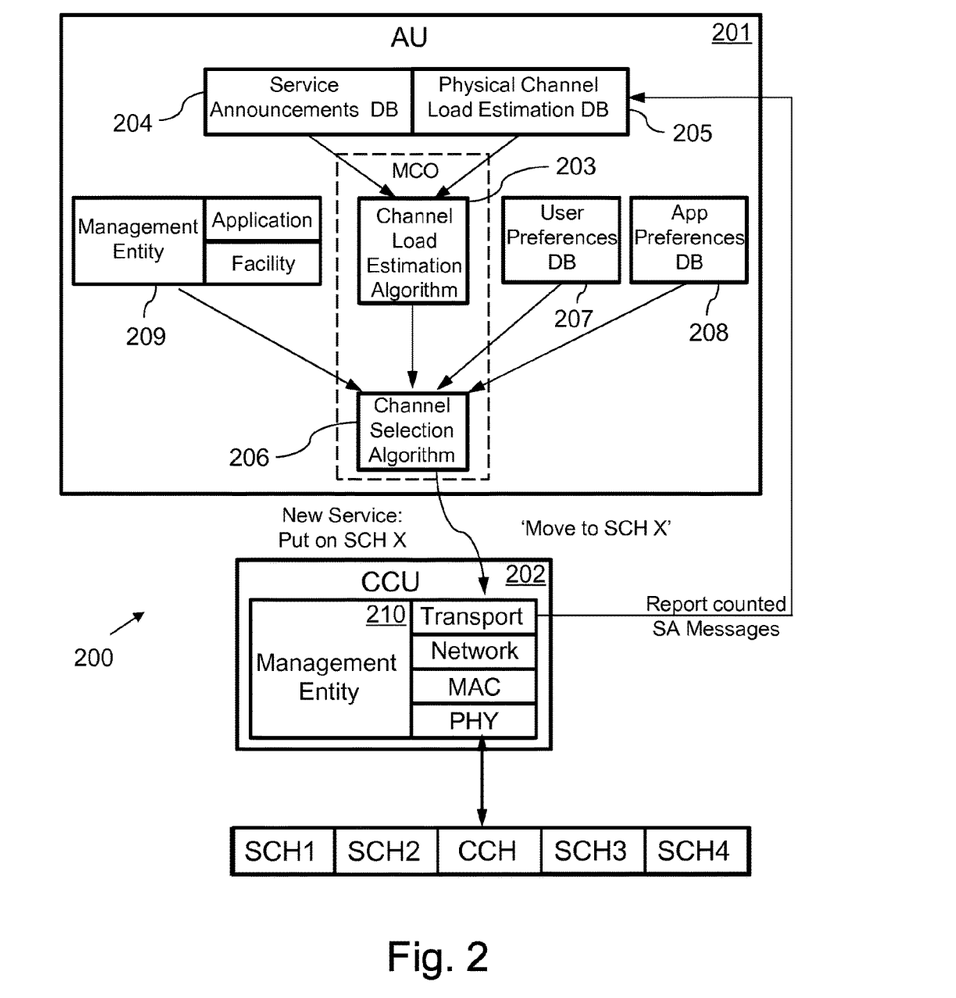
FIG. 2 is a diagram illustrating components of a communicating entity for executing a multi-channel operation procedure in accordance with an embodiment of the present invention.

Turning now to FIG. 2, components of a communicating entity 200 are illustrated for executing a multi-channel operation (MCO) procedure in accordance with embodiments of the present invention, independent of whether this communicating entity 200 functions as an SP 101 or as an SU 104. Accordingly, each communicating entity 200 comprises an application unit 201, hereinafter briefly AU, and a communication control unit 202, hereinafter briefly CCU, which both may be implemented as hardware platforms. Management entities 209 and 210, respectively, provide system configuration parameters corresponding to system entity AU and CCU, respectively. In relevance to embodiments of the present invention configuration parameters pertaining to channel load measurements are part of management entity 210. On the other hand, configuration parameters pertaining to the channel load estimation and selection algorithm are part of management entity 209.

The AU 201 is configured to execute the channel load estimation for service channels SCH. In the illustrated embodiment it is assumed that in addition to the CCH there are a total number of four service channels—SCH1-SCH4—in place, which are shown at the bottom of FIG. 2. The channel load estimation is performed by channel load estimation module 203. In accordance with the present invention channel load estimation is performed through a combination of physical channel measurements and an analysis of service announcement messages (SAMs) transmitted by service providers 101 within the network. Consequently, channel load estimation module 203 receives as channel load estimation input information from service announcements database 204 and from physical channel load estimation database 205.

Since there will be an inevitable interaction (and possibly some contradiction) between channel load estimated via SAMs on the one hand and channel load measured by physically listening on the channel on the other hand, the channel load estimation module 203 may apply a resolution mechanism as follows: If both are available, the channel load estimation module 203 may trust physical measurements, and it may use the SAM-derived load for estimating future demand on the channel. Alternatively, if both are available, the channel load estimation module 203 may perform averaging:

$$CL_{SCH}=a*CL_{SAM}+b*CL_{PHY},$$

where a and b are weights and $CL_x$ is the channel load estimate for SAM- and PHY-based channel load estimation.

In any case, the resulting channel load information is forwarded to channel selection module 206. Together with information on user preferences and application priorities received from User Preferences Database 207 and App Preferences Database 208, respectively, as well as application and/or facility related information management entity 209, the channel selection module 206 determines in a dynamic fashion a suitable SCH for putting a new service on, as will be explained in more detail in connection with FIG. 3 (for the case of an SP 101) and FIG. 4 (for the case of an SU 104).

In the illustrated scenario the channel selection module 206 determined service channel SCH X for the new service in question. This information is forwarded to the CCU 202, which comprises a management entity 210 that processes this information down the protocol stack. Finally, at the physical 'PHY' layer of the protocol stack a transceiver of the respective communicating entity 200 is switched to the respective service channel SCH X (while a different transceiver of the communicating entity 200 remains on the CCH).

In order to continuously enable efficient and reliable channel load estimation, the management entity 210 of the CCU 202 counts, at the transport layer, received SAMs broadcast on the CCH and reports the number of counted SAMs back to the physical channel load estimation database 205 of AU 201.

Figure 3:
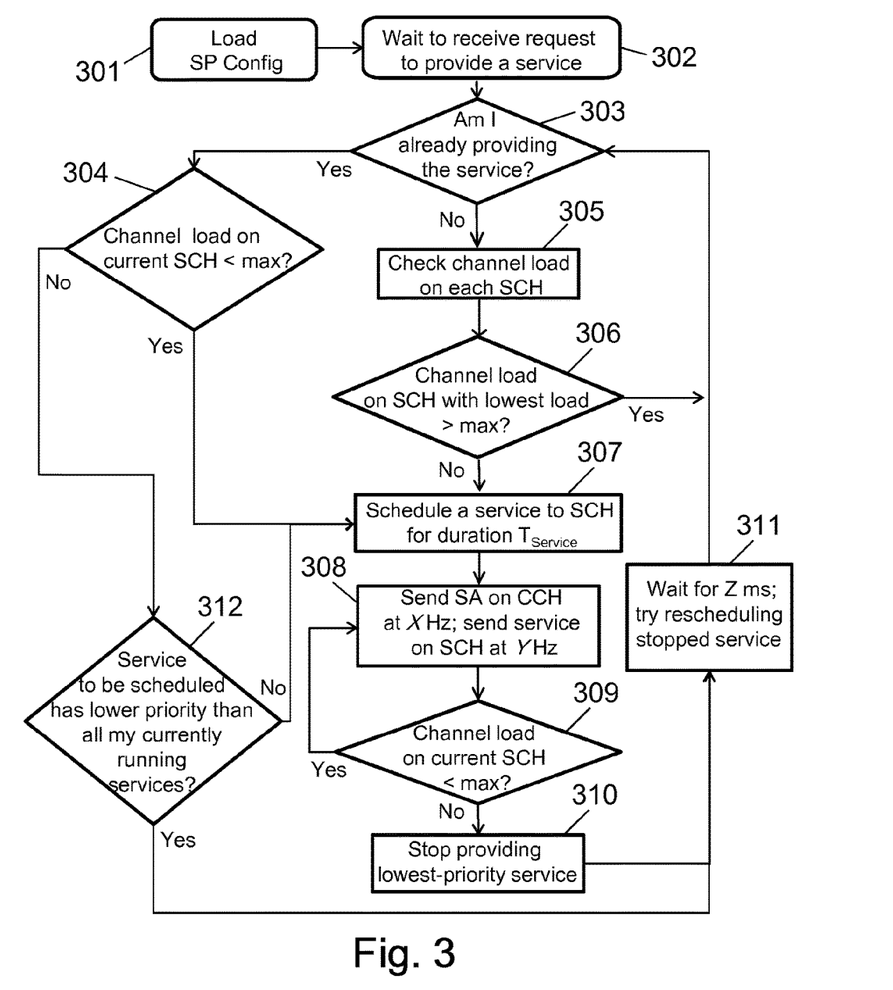
FIG. 3 is a diagram illustrating a service provider's multi-channel operation flowchart in accordance with an embodiment of the present invention.

FIG. 3 is a flowchart illustrating details of the MCO operations performed by a service provider, SP 101. The SP 101 may be a static SP, e.g. deployed in form of roadside unit, RSU 102, or a mobile SP 103, e.g. a vehicle functioning as a coordinating entity of a cooperative application (for instance, the leader of a platoon).

In a first step, as shown at 301, the SP configuration is loaded. This configuration may include user preference configurations that can be loaded from a dedicated user preferences database (e.g., the User Preferences database 207 shown in FIG. 2) and or application preference configurations that can be loaded from a dedicated application preferences database (e.g., the App Preferences database 208 shown in FIG. 2). Once the SP configuration is loaded, the SP waits to receive a request from any service user within its coverage area, as shown at 302.

Once such a request is received, the SP checks in a first step, shown at 303, whether it is already providing the requested service. If so, the SP checks in a second step, shown at 304, whether the channel load on the current SCH is lower than a predefined maximum admissible load. If so, the SP schedules the requested service to the current SCH for a predefined duration $T_{Service}$, as shown at 307. On the other hand, if the check performed at 303 yields that the SP is not yet providing the requested service, at 305, the SP checks the channel node and each of the existing SCHs and further, shown at 306, whether the channel load on the SCH with the lowest load exceeds a predefined maximum admissible load. If not, the SP proceeds with step 307, i.e. schedules the requested service to the current SCH for a predefined duration $T_{Service}$.

Once the requested service is scheduled on a particular SCH, the SP sends the service on this SCH with a predefined frequency (in FIG. 3 denoted by 'Y' Hz) and, in addition, transmits SAMs on the CCH with a predefined frequency (in FIG. 3 denoted by 'X' Hz), as shown at 308. This process is repeated as long as the channel load on the current SCH is below a predefined maximum admissible threshold, as shown at 309. In case this threshold is exceeded, as shown at 310, the SP selects the service with the currently lowest priority and stops providing this service. Afterwards, as shown at 311, the SP waits for a predefined period of time (in FIG. 3 denoted by 'Z' ms) and, after expiry of this time period, the SP tries to reschedule the stopped service by returning to step 303.

In case the SP notes in step 303 that a requested service is already provided, but in step 304 that the channel load on the current SCH exceeds a predefined maximum admissible threshold, the SP checks in step 312 whether the requested service has a lower priority than all other services the SP is currently running. If so, the SP turns to step 311, i.e. waits for a predefined period of time and tries re-rescheduling after this period of time. On the other hand, if it turns out in step 312 that the SP is running services having a lower priority than the currently requested service, the SP proceeds with step 307, i.e. it schedules the requested service to the current SCH for a predefined duration $T_{Service}$. By doing so, the multi-channel operation procedure according to embodiments of the invention achieves a situation in which SCHs are not getting overloaded by services with lower priority, and in which stability and continuity is ensured in the service channels for higher priority services and/or prioritized applications.

Figure 4:
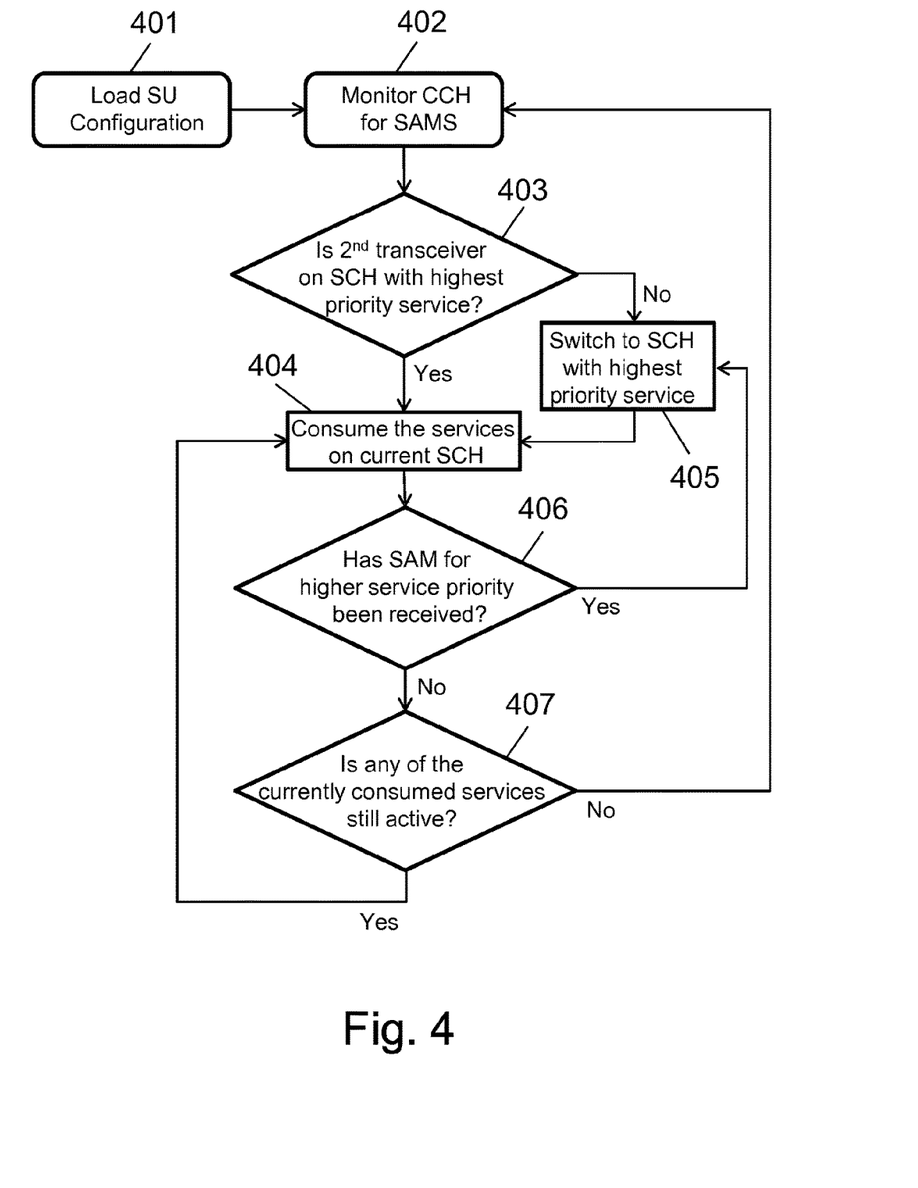
FIG. 4 is a diagram illustrating a service user's multi-channel operation flowchart in accordance with an embodiment of the present invention.

FIG. 4 is a flowchart illustrating details of the corresponding MCO operations performed by a service user, SU. In this embodiment it is assumed that the SU, like the SP, uses a User and App preference configurations for distinguishing service priorities. Once the SU configuration is loaded at 401, the SU monitors the CCH for SAMs, as shown at 402. When there is a service advertised by an SP that the SU is interested in, SU moves its second transceiver (while the first transceiver being tuned on the CCH) to the SCH that this service is on. Then, at 403, the SU performs a check whether its second transceiver is on the SCH with highest priority service. If so, at 404, the SU consumes this service on the current SCH. If not, at 405, the SU first switches to the SCH with the highest priority service and then consumes the service on this SCH. As already indicated above, to ensure that the highest priority service in the area is being serviced, the SU tracks the SAMs on the CCH. If a higher priority service is announced via an SAM on the CCH and the respective SAM is received at the SU, as shown at 406, the SU returns to step 405, i.e. moves to the SCH service channel where that service is provided. In the case of concurrent services with the same priority, it may be provided that the algorithm selects one service randomly. Finally, at 407, the SU performs a check whether any of the currently consumed services is still active. If so, the SU returns to step 404, otherwise the SU returns to step 402.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for multi-channel operation in a vehicular network, the vehicular network including a plurality of communicating entities being designated as either a service provider or as a service user, a control channel for exchanging management frames among the communicating entities, and at least two different service channels for application-specific information exchanges among the communicating entities, the method comprising:
   performing, by a first communication entity, channel load estimation through a combination of physical channel measurements and an analysis of transmitted service announcement messages (SAM); generated by service providers, and
   performing, by the first communication entity, based on the results of the channel load estimation together with existing services on the service channels and user and/or application preference configurations, dynamic service channel switching to either provide or consume a service.

2. The method according to claim 1, wherein the first communicating entity, in the analysis of the transmitted SAMs, takes into consideration the relevance of each SAM based on a time period after reception of the respective SAM and/or a distance of the first communicating entity to a sender of the respective SAM.

3. The method according to claim 1, wherein the physical channel measurements are performed in a passive mode for channels for which a communicating entity is currently switched on.

4. The method according to claim 1, wherein communicating entities participating in a cooperative application that includes continuous exchange of messages among the participants, provide collected information about their channel measurements and about overheard SAMs to a coordinating entity of the cooperative application.

5. The method according to claim 4, wherein the participants of the cooperative application spend a portion of channel time scanning other channels and report the scanning results to the coordinating entity of the cooperative application.

6. The method according to claim 1, wherein a service provider determines the current number of services per service channel by tracking SAMs broadcasted on the control channel.

7. The method according to claim 1, wherein a service provider uses the user and/or application preference configurations to determine service priorities and to decide which service to advertise in case of concurrent services.

8. The method according to claim 1, wherein a service provider for advertising a new service, chooses a same service channel that the service provider's other services are using if the resulting load on that service channel is below a predefined maximum channel load.

9. The method according to claim 1, wherein a service provider that provides concurrent services drops lower priority services of its concurrent services in case a load on a service channel the service provider is transmitting on is above a predefined maximum channel load.

10. The method according to claim 1, wherein a service user performs a check whether any of its transceivers is tuned on a service channel with a currently highest priority service.

11. The method according to claim 10, wherein a service user performs the check in regular intervals upon the reception of a SAM on the control channel.

12. The method according to claim 1, wherein a service user, in case a service is being announced having a higher priority than a currently highest priority service, switches to a service channel where the announced service is provided.

13. The method according to claim 1, wherein a service user, in case of concurrent services with a same priority, selects one of the concurrent services randomly.

14. The method according to claim 1, wherein a user preference database and/or a service/application preference database for storing the user and/or application preference configurations are set as default for vehicles, so as to allow users to define customized preferences.

15. A vehicular network with multi-channel operation support, the network comprising:
- a plurality of communicating entities designated either as a service provider or as a service user;
- a control channel for exchanging management frames among the communicating entities; and
- at least two different service channels for application-specific information exchanges among the communicating entities,
- wherein the communicating entities are configured to perform channel load estimation through a combination of physical channel measurements and an analysis of the transmitted service announcement messages (SAM) generated by service providers, and to perform, based on results of the channel load estimation together with existing services on the service channels and user and/or application preference configurations, dynamic service Channel switching to either provide or consume a service.

* * * * *